(12) United States Patent
Grant

(10) Patent No.: US 10,825,341 B1
(45) Date of Patent: *Nov. 3, 2020

(54) GENERATING EMERGENCY VEHICLE WARNINGS

(71) Applicant: State Farm Mutual Automobile Insurance Company, Bloomington, IL (US)

(72) Inventor: Rosemarie Geier Grant, Ellsworth, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 49 days.

This patent is subject to a terminal disclaimer.

(21) Appl. No.: 16/513,840

(22) Filed: Jul. 17, 2019

Related U.S. Application Data

(63) Continuation of application No. 16/255,048, filed on Jan. 23, 2019, which is a continuation of application
(Continued)

(51) Int. Cl.
*G08G 1/0965* (2006.01)
*G08G 1/16* (2006.01)
(Continued)

(52) U.S. Cl.
CPC ..... *G08G 1/0965* (2013.01); *G08G 1/096844* (2013.01); *G08G 1/162* (2013.01);
(Continued)

(58) Field of Classification Search
CPC .......... G08G 1/0965; G08G 1/096844; G08G 1/162; G08G 1/166; G08G 1/205; G06Q 40/08; G07C 5/008
See application file for complete search history.

(56) References Cited

U.S. PATENT DOCUMENTS

| 5,495,243 A | 2/1996 | McKenna |
| 5,705,980 A | 1/1998 | Shapiro |

(Continued)

*Primary Examiner* — Mohamed Barakat
(74) *Attorney, Agent, or Firm* — Marshall, Gerstein & Borun LLP

(57) ABSTRACT

The present disclosure generally relates to generating emergency vehicle warnings, alternate vehicle routing recommendations and/or insurance-related data based upon emergency vehicle warning data. More particularly, the present disclosure relates to generating data representative of emergency vehicle warnings and/or alternate routing based upon real-time information related to an emergency vehicle. The information related to the emergency vehicle may include emergency vehicle origination location data, emergency vehicle current location data, emergency vehicle route data, and/or emergency vehicle destination location data. An emergency vehicle warning and/or alternate vehicle routing for non-emergency response vehicles may be generated based further on information related to a non-emergency vehicle. In one aspect, an emergency vehicle may wirelessly communicate with the non-emergency vehicle and/or an insurance provider remote server. The insurance provider may adjust auto insurance for insurers having vehicles with the vehicle safety functionality discussed herein to reflect lower risk and provide insurance savings to customers.

20 Claims, 5 Drawing Sheets

Related U.S. Application Data

No. 14/694,498, filed on Apr. 23, 2015, now Pat. No. 10,249,189.

(60) Provisional application No. 62/107,745, filed on Jan. 26, 2015.

(51) Int. Cl.
  G08G 1/00 (2006.01)
  G08G 1/0968 (2006.01)
  G06Q 40/08 (2012.01)
  G07C 5/00 (2006.01)

(52) U.S. Cl.
  CPC ............. G08G 1/166 (2013.01); G08G 1/205 (2013.01); *G06Q 40/08* (2013.01); *G07C 5/008* (2013.01)

(56) References Cited

U.S. PATENT DOCUMENTS

| | | |
|---|---|---|
| 6,252,519 B1 | 6/2001 | McKenna |
| 6,339,382 B1 | 1/2002 | Arbinger |
| 6,417,782 B1 | 7/2002 | Darnall |
| 6,529,831 B1 | 3/2003 | Smith |
| 6,630,891 B1 | 10/2003 | Dilling |
| 6,700,504 B1 * | 3/2004 | Aslandogan ............ G08G 1/087 340/901 |
| 6,958,707 B1 | 10/2005 | Siegel |
| 7,271,736 B2 | 9/2007 | Siegel |
| 7,430,472 B2 | 9/2008 | Zhao |
| 7,515,065 B1 * | 4/2009 | Bygrave ............... G08G 1/0965 340/901 |
| 8,457,892 B2 * | 6/2013 | Aso ....................... B60W 30/10 701/400 |
| 8,520,695 B1 | 8/2013 | Rubin |
| 8,723,680 B1 | 5/2014 | Baker |
| 8,838,321 B1 | 9/2014 | Ferguson |
| 8,954,226 B1 | 2/2015 | Binion |
| 9,102,261 B2 | 8/2015 | Chang |
| 9,147,353 B1 | 9/2015 | Slusar |
| 9,204,463 B2 | 12/2015 | Nagai |
| 9,355,423 B1 | 5/2016 | Slusar |
| 9,361,409 B2 | 6/2016 | Kozloski |
| 9,390,451 B1 * | 7/2016 | Slusar .................... G06Q 40/04 |
| 2003/0169181 A1 | 9/2003 | Taylor |
| 2004/0155795 A1 | 8/2004 | Quintana |
| 2004/0246144 A1 | 12/2004 | Siegel |
| 2005/0093717 A1 | 5/2005 | Lilja |
| 2005/0164673 A1 | 7/2005 | Ehlers |
| 2006/0184319 A1 | 8/2006 | Seick |
| 2007/0132608 A1 | 6/2007 | Votaw |
| 2007/0273551 A1 | 11/2007 | Jacobs |
| 2009/0117274 A1 * | 5/2009 | Ma ........................ C07F 17/00 427/255.28 |
| 2009/0174572 A1 | 7/2009 | Smith |
| 2009/0295560 A1 | 12/2009 | Koliopoulos |
| 2010/0141475 A1 | 6/2010 | Rijks |
| 2011/0018736 A1 | 1/2011 | Carr |
| 2011/0115644 A1 | 5/2011 | Grotendorst |
| 2011/0187559 A1 | 8/2011 | Applebaum |
| 2012/0136559 A1 | 5/2012 | Rothschild |
| 2012/0313792 A1 | 12/2012 | Behm |
| 2013/0024100 A1 | 1/2013 | Claudel |
| 2013/0135118 A1 | 5/2013 | Ricci |
| 2013/0184980 A1 | 7/2013 | Ichikawa |
| 2013/0218603 A1 * | 8/2013 | Hagelstein ............ G06Q 40/08 705/4 |
| 2014/0070962 A1 | 3/2014 | Holland |
| 2014/0085107 A1 | 3/2014 | Gutierrez |
| 2014/0118553 A1 | 5/2014 | Diba |
| 2014/0227991 A1 | 8/2014 | Breton |
| 2014/0253326 A1 | 9/2014 | Cho |
| 2014/0309814 A1 | 10/2014 | Ricci |
| 2014/0309815 A1 | 10/2014 | Ricci |
| 2014/0354449 A1 | 12/2014 | Alam |
| 2014/0358896 A1 | 12/2014 | Camacho |
| 2015/0112733 A1 | 4/2015 | Baker |
| 2015/0116133 A1 | 4/2015 | Mawbey |
| 2015/0156245 A1 | 6/2015 | Risch |
| 2015/0172517 A1 | 6/2015 | Chen |
| 2015/0243165 A1 | 8/2015 | Elsheemy |
| 2016/0019651 A1 | 1/2016 | Grimm |
| 2016/0093213 A1 * | 3/2016 | Rider ................... G08G 1/0965 701/537 |
| 2016/0210858 A1 | 7/2016 | Foster |
| 2017/0131712 A1 | 5/2017 | Ricci |

\* cited by examiner

GENERATING EMERGENCY VEHICLE WARNINGS

CROSS REFERENCE TO RELATED APPLICATION

This applications is a continuation of, and claims the benefit of, U.S. patent application Ser. No. 16/255,048, filed Jan. 23, 2019 and entitled "Generating Emergency Vehicle Warnings," which is a continuation of U.S. patent application Ser. No. 14/694,498 (now U.S. Pat. No. 10,249,189), filed Apr. 23, 2015 and entitled "Generating Emergency Vehicle Warnings," which claims priority, under 35 U.S.C. § 119(b), to U.S. Provisional Patent Application Ser. No. 62/107,745, filed on Jan. 26, 2015, and entitled Methods and Systems for Generating Emergency Vehicle Warnings, the disclosures of which are incorporated herein by reference in their entireties. This application is also related to U.S. patent application Ser. No. 14/694,493 (now U.S. Pat. No. 10,008,111), filed on Apr. 23, 2015 and entitled Generating Emergency Vehicle Warnings; U.S. patent application Ser. No. 15/918,123 filed Mar. 12, 2018 (now U.S. Pat. No. 10,176,716); and U.S. patent application Ser. No. 16/197,564 filed Nov. 21, 2018.

TECHNICAL FIELD

The present disclosure generally relates to methods and systems to generate emergency vehicle warnings. More particularly, the present disclosure relates to generating data representative of emergency vehicle warnings based upon real-time information related to an emergency vehicle, and/or insurance-related data based upon emergency vehicle warning data.

BACKGROUND

Emergency response vehicles are often slowed down on their way to fires and accidents by other vehicles that do not move out of the way. Newer cars have better sound-proofing and drivers maybe listening to loud music which prevents them from hearing approaching sirens. Additionally, not all people know where to move to get out of the way of emergency vehicles. This condition (blocked roads) often slows first responders when time is of the essence. These circumstances may lead to accidents and collisions between emergency responders and other vehicles.

Additionally, conventionally lights and sirens have long been used to alert drivers of approaching EMS vehicles. Lately, with some vehicles, the sirens have been moved from the top of emergency trucks to bumper level in order to direct the associated sound and illumination toward other drivers. However, there are still deficiencies associated with these systems, such as drawbacks related to accidents and time.

SUMMARY

Systems and methods are provided for generating data representative of emergency vehicle warnings, and/or generating data representative of insurance policies based upon data representative of emergency vehicle warnings. The systems and methods may reduce EMS/auto collision accidents, speed response time (e.g., fire trucks, ambulances, police, etc.) which might reduce fire losses, and/or faster response to auto accidents may reduce injuries/save lives.

In one aspect, a computer implemented method for generating data representative of an emergency vehicle warning and/or alternate vehicle route may be provided. The method may include (1) receiving, via or at one or more processors mounted on a non-emergency vehicle, emergency vehicle data via wireless communication and/or data transmission, wherein the emergency vehicle data is representative of: emergency vehicle (i) origination location, (ii) current location, (iii) current route. (iv) current destination, (v) current speed, and/or (vi) type of emergency, such as vehicle accident, house fire, or other emergency; (2) generating or collecting, via or at the one or more processors mounted on the non-emergency vehicle, non-emergency vehicle data, wherein the non-emergency vehicle data is representative of: non-emergency vehicle (a) origination location, (b) current location, (c) route data, (d) destination, and/or (e) speed; (3) determining or generating, via or at the one or more processors mounted on the non-emergency vehicle, emergency vehicle warning data and/or an alternate vehicle route data based upon computer analysis or comparison of the emergency and non-emergency vehicle data, the alternate vehicle route directing the non-emergency vehicle to avoid the route of the emergency vehicle or otherwise alleviates an amount that the non-emergency vehicle interferes with the route of the emergency vehicle; and/or (4) causing, via or at the one or more processors mounted on the non-emergency vehicle, the emergency vehicle warning data and alternate vehicle route data, to be visibly or audibly presented, or otherwise provided, to a driver of the non-emergency vehicle (or to the non-emergency vehicle itself) to facilitate alleviating potential vehicle accidents between emergency response and non-emergency response vehicles, and/or shortening emergency response times for emergency vehicles.

The method may include generating, via the one or more processors mounted on the non-emergency vehicle, insurance policy data for the driver of the non-emergency vehicle based upon the driver following recommendations associated with emergency vehicle warnings or alternate vehicle routing that avoids emergency vehicles en route; and/or transmitting, via the one or more processors mounted on the non-emergency vehicle, to an insurance provider remote server to facilitate the insurance provider providing auto insurance cost savings to the driver (or other insured) based upon the insurance policy data and/or functionality associated with emergency vehicle avoidance. The insurance policy data may be representative of an insurance risk associated with a non-emergency vehicle, and/or the insurance risk may be lower for a non-emergency vehicle that is equipped with an emergency vehicle warning data receiving device. Additionally or alternatively, the insurance policy data may be representative of an insurance risk associated with an emergency vehicle, and/or the insurance risk may be lower for an emergency vehicle that is equipped with an emergency vehicle warning data generation, transmitting, and/or receiving device.

The method may include transmitting, via the one or more processors mounted on the non-emergency vehicle, emergency vehicle warning data and alternate vehicle route data to other vehicles or processors. In one embodiment, the non-emergency vehicle may be an autonomous, semi-autonomous, or smart vehicle. The autonomous, semi-autonomous, or smart vehicle may automatically direct itself to take an alternate vehicle route and/or take self-driving actions that allow the autonomous, semi-autonomous, or smart vehicle avoid the emergency vehicle or the route of the emergency vehicle. Alternatively, the emergency vehicle may be an autonomous, semi-autonomous, or smart vehicle, and the autonomous, semi-autonomous, or smart vehicle automatically may direct itself to take an alternate vehicle route and take self-driving actions that allow the autonomous or smart vehicle avoid the non-emergency vehicle or the route of the non-emergency vehicle.

The method may further include adjusting an insurance policy, premium, rate, or discount for the non-emergency vehicle based upon the non-emergency vehicle having the vehicle warning and/or alternate vehicle route generation functionality discussed herein. The method may include additional, less, or alternate functionality, including that discussed elsewhere herein, and/or the method may be implemented via a computer system, communication network, one or more processors, and/or computer-executable instructions stored on non-transitory storage media or computer-readable medium.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed herein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1:
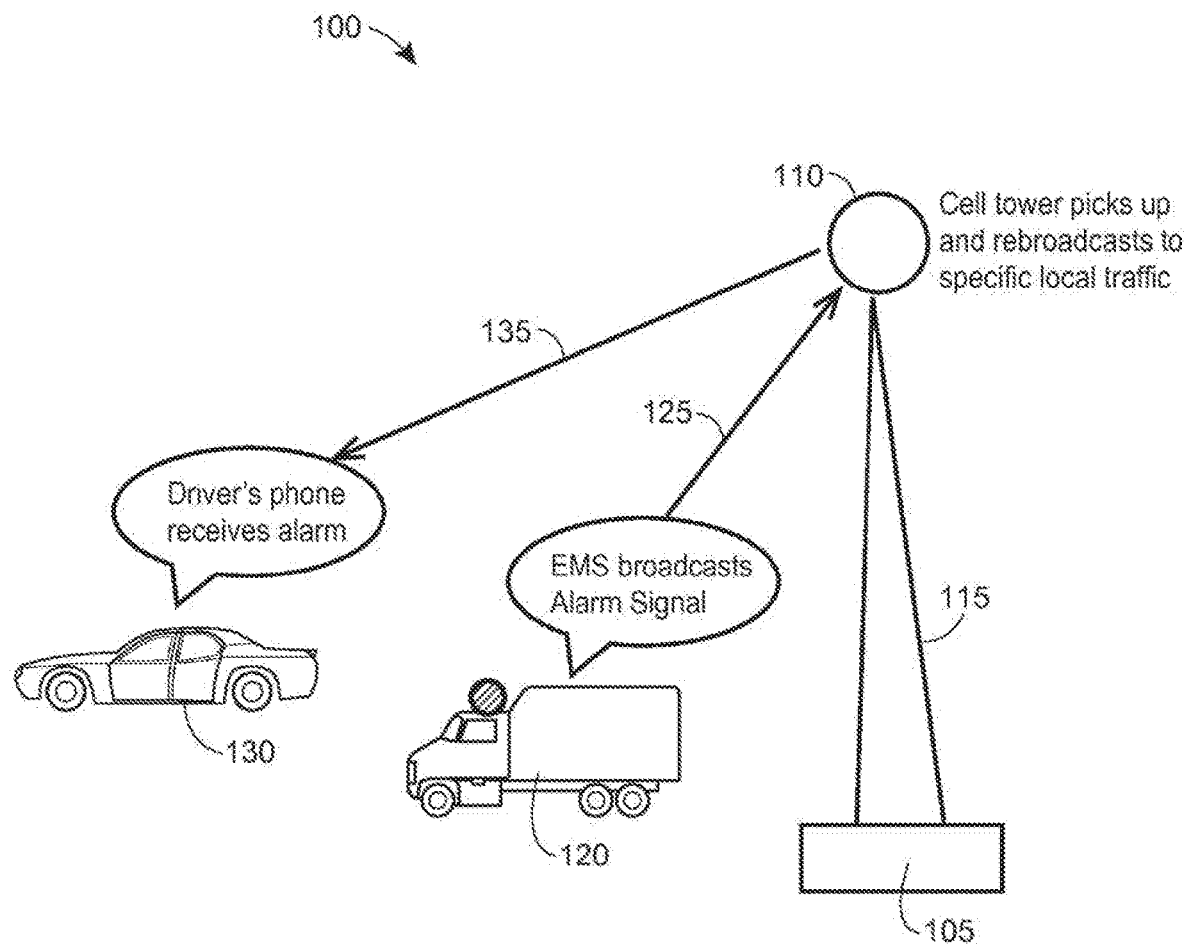
FIG. 1 depicts an exemplary system for generating emergency vehicle warning data and/or insurance-related data based upon the emergency vehicle warning data.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

An emergency vehicle location alert may be provide using a system similar to the nationwide text emergency alert system, called Wireless Emergency Alerts (WEA) implemented by the National Weather Service, to provide emergency alerts to, for example, cellular telephones. Vehicles in a path of police, fire trucks, and ambulances, etc. may, thereby, be warned of impending emergencies. WEA-capable telephones may be provided to deliver just-in-time driver alerts that warn of approaching EMS vehicles. The alerts may be tailored with messages, such as "stop," "move right," "move left," "move onto the shoulder," "merge to right lane," and/or the like, or just duplicate a siren tone, to clear the road ahead. Additionally or alternatively, non-emergency vehicles may be automatically or manually re-routed to clear the path of emergency response vehicles. Algorithms may be provided to determine a relative position of Emergency Management Services (EMS) vehicles and local traffic so as to not unduly warn and/or re-direct cars not in the path of travel of the EMS vehicles.

Accordingly, the systems and methods of the present disclosure generally relate to generating emergency vehicle warnings (and/or alternate vehicle routing). More particularly, the methods and systems relate to generating data representative of emergency vehicle warnings (and/or alternate vehicle routing) based upon real-time information related to an emergency vehicle. The information related to the emergency vehicle may include, for example, emergency vehicle origination location data, emergency vehicle current location data, emergency vehicle route data, and/or emergency vehicle destination location data. An emergency vehicle warning may be generated based further upon information related to a non-emergency vehicle. The information related to the non-emergency vehicle may include, for example, non-emergency vehicle origination location data, non-emergency vehicle current location data, non-emergency vehicle route data, and/or non-emergency vehicle destination location data.

The systems and methods may further generate insurance-related data based upon, for example, emergency vehicle warning data, alternate vehicle routing data, and/or telematics data. The insurance-related data may be representative of a lower insurance risk for an emergency vehicle that includes an emergency vehicle device (e.g., emergency vehicle device 205 of FIG. 2) compared to an emergency vehicle that does not include an emergency vehicle device 205. Furthermore, the insurance-related data may be representative of a lower insurance risk for a non-emergency vehicle that includes a non-emergency vehicle device (e.g., non-emergency vehicle device 265 of FIG. 2) compared to a non-emergency vehicle that does not include a non-emergency vehicle device 205.

While the systems and methods of the present disclosure may generate and transmit insurance-related data, which may include or be representative of personal information and individual insurance policy information, the systems and methods may include an "opt-in" feature that enables any given individual to select a content of any insurance policy related data. Furthermore, the systems and methods may automatically exclude all personal information and individual insurance policy information from the insurance-related data. For example, the systems and methods may generate insurance-related data that only includes an indication as to whether any given vehicle is equipped with an emergency vehicle warning device, such as to avoid transmitting or broadcasting personal or sensitive information unnecessarily.

It should be noted that currently, the National Weather Service is able to send automatic alerts to, for example, cellular telephones to warn the associated users of bad weather. These are sent automatically (no subscription necessary) to "WEA-capable" phones (see, e.g., http://www.noaa.gov/features/03_protecting/wireless_emergency_alerts.html). In one embodiment, a method similar to the National Weather Service may be developed that would alert drivers in the path of EMS vehicles. From an insurance perspective this system may reduce EMS/auto collision accidents, speed response time (e.g., fire trucks) which might reduce fire losses, and faster response to auto accidents may reduce injuries/save lives.

The present embodiments may also be used to notify drivers of tornados, hail storms, wind storms, rain, snow, heavy rain, heavy snow, wind, thunder storms, hurricanes, etc. in the vicinity of their vehicle and/or along their route of travel. For instance, based upon GPS coordinate comparison of a weather event and a traveling vehicle, a warning or alternate route to a driver may be provided (such as "Tornado Watch 15 miles ahead, take alternate route, and seek shelter"; "Heavy Snow 30 miles ahead, take alternate route"; "Thunders storms 5 miles ahead moving East at 40 mph"; etc.

In certain aspects, the present embodiment may provide benefits to insurance providers and insurance customers, such as to lessen the amount of damage that results from insurance-related events, such as house fires, vehicle accidents, home breakins, etc. Emergency responders may arrive on the scene of an insurance-related event quicker, and thus taken prompt action to lessen damage. The functionality described herein may be used to adjust or update insurance policies, such as adjust or update insurance premiums, rates, discounts, risk levels, etc. associated with auto, home, health, life, personal, personal articles, and/or other types of insurance based upon an insured having one or more of the functionalities or capabilities discussed herein.

In one embodiment, an autonomous vehicle may be in direct or indirect wireless communication or data transmission with a smart emergency vehicle. As the smart emergency vehicle travels to the scene of an insurance-related event, such as a vehicle accident, fire, medical emergency, or police emergency, the smart emergency vehicle may broadcast or transmit (via a vehicle-mounted transceiver) certain information to vehicles directly in front of it and/or along its route of travel. The information transmitted may include a position, destination, speed, heading, route, GPS location, and/or other information associated with the smart emergency vehicle. A vehicle controller (having an associated transceiver) of a non-emergency vehicle may receive that information and compare it with the position, destination, speed, heading, route, GPS location, and/or other information of the non-emergency vehicle.

Based upon the comparison, the vehicle controller may generate an audible or visual alert announcing the presence or route of the emergency vehicle, and/or provide recommendations and/or alternate routes that may avoid the emergency vehicle (such as "Move over to the shoulder"; "Turn right and take alternate route along Main St. to destination"; "Pull off to the side street"; "Pull into the shopping mall parking mall to let emergency vehicles pass," etc.) The visual or audible alert may get the drivers attention.

Also, if an emergency vehicle alert or other alert is received, the vehicle may automatically turn off the vehicle's entertainment system (e.g., loud music) and then provide recommendations or directions to the driver. If the non-emergency vehicle receiving the emergency vehicle information via the broadcast is a smart and/or autonomous vehicle, the non-emergency vehicle may automatically re-route itself (such as determine an alternate route to the destination and/or pull off to the side of the road) to avoid the path of the emergency vehicle and/or alleviate an amount that the non-emergency vehicle interferes with the path of the emergency vehicle.

As noted, the present embodiments may facilitate getting non-emergency vehicles out of the way on emergency vehicles. The present embodiments may alert drivers not to head/drive in the direction of emergency vehicles, and/or may provide intelligent routing based upon wireless communication and/or data transmission indicating the real-time or current location of emergency vehicles, accident scenes, house fires, hospital locations, police scenes, etc. In some aspects, a virtual navigation map may pop up on a mobile device, smart vehicle display screen, or vehicle-mounted navigation unit to provide just-in-time vehicle re-routing to get around or avoid the route of emergency vehicles, vehicle accidents, etc.

Emergency vehicles may include transponders or transceivers that broadcast to cell towers, mobile devices, and/or vehicles. The transponders or transceivers may also broadcast data to smart vehicles and/or autonomous vehicles, such as via P2P wireless communication and/or vehicle-to-vehicle (V2V) wireless communication. Warnings may be generated at the emergency vehicles themselves, and/or at processors associated with the cell towers, mobile devices, vehicles, smart vehicles, and/or autonomous vehicles based upon the data received from the emergency vehicles (such as data associated with current vehicle location, route, destination, etc.). The warnings may include information about vehicle accidents, accident locations, suggest alternate routing, and/or provide other forewarnings. Automation of common procedures, triggered by emergency vehicle warnings, may reduce computer processing times, memory requirements and/or related facilities. Using the methods and systems, insurance customers may be automatically warned of emergency vehicle(s) in the proximity of the customer's location, focused on relevant information to the emergency vehicle(s), and/or provided with reduced risk to the insurance customer and reductions in related insurance agreement information.

Exemplary System for Generating Emergency Vehicle Warning Data and/or Insurance-Related Data With reference to FIG. 1, a system for generating emergency vehicle warning data and/or insurance-related data 100 may include a remote location 105, a communication system 110, at least one emergency vehicle 120, and/or at least one non-emergency vehicle 130. While only one emergency vehicle 120 and only one non-emergency vehicle 130 are depicted in FIG. 1, it should be understood that any number of emergency vehicles 120 and only one non-emergency vehicles 130 may be included in a system for generating emergency vehicle warning data 100. The emergency vehicles 120 and non-emergency vehicle 130 may be in direct wireless communication or data transmission with one another, such as via peer-to-peer (P2P) communication, and/or in indirect wireless communication or data transmission with one another, such as by using a cell tower or remote server/processor associated with a remote location 105 as a relay.

In any event, an emergency call may be received by, for example, a dispatcher located, for example, at the remote location 105. In response to the emergency call, the dispatcher may assign a particular emergency response vehicle to respond to the emergency call. In conjunction with assigning the emergency vehicle, the dispatcher may enter emergency vehicle data into, for example, a remote emergency management services device (e.g., remote EMS computing device 210 of FIG. 2). The emergency vehicle data may be representative of, for example, an emergency vehicle origination location data, an emergency vehicle route data, and/or an emergency vehicle destination location data.

The dispatcher may transmit the emergency vehicle data to the emergency vehicle 120 via a first communication link 115 and a second communication link 125. The first communication link 115 and the second communication link 125 may combine to define, for example, a peer-to-peer communication link. Alternatively, the first communication link 115 and the second communication link 125 may combine with the communication system 110 to define, for example, a cellular telephone network.

In response to receiving the emergency vehicle data from the remote location, the emergency vehicle 120 may begin transmitting emergency vehicle data. For example, the emergency vehicle 120 may transmit emergency vehicle data back to the remote location 105, via the first communication link 115 and the second communication link 125, and/or to the non-emergency vehicle 130 via the second communication link 125 and a third communication link 135. Similar, to the first communication link 115 and the second communication link 125, the second communication link 125 and the third communication link 135 may combine to define, for example, a peer-to-peer communication link. Alternatively, the second communication link 125 and the third communication link 135 may combine with the communication system 110 to define, for example, a cellular telephone network.

As an alternative to the remote location 105 and/or the emergency vehicle 120 transmitting emergency vehicle data, emergency vehicle warning data may be generated, using a processor of a computing device (e.g., processor 275 or processor 250, respectively), based upon the emergency vehicle data, and the remote location 105 and/or the emergency vehicle 120 may transmit/receive the emergency vehicle warning data.

In an additional embodiment, the emergency vehicle 120 may wirelessly communicate current location, route, speed, destination, type of emergency, and/or other information to a smart roadside sign. The smart roadside sign may display messages to vehicles (such as non-emergency vehicles 130) passing by, such as displaying road or travel conditions that a non-emergency vehicle 130 is approaching, and/or the status or route of an emergency vehicle 120 approaching or otherwise in the vicinity. The smart roadside sign may display or otherwise indicate radio stations that travelers may tune their radios to in order to hear further updates, and/or current locations of emergencies (such as vehicle accidents) and/or emergency vehicles 120. Additionally or alternatively, the smart roadside sign may wirelessly communicate emergency vehicle 120 information (such as the information received directly or indirectly from an emergency vehicle 120) directly or indirectly to non-emergency vehicles 130 or mobile devices of travelers to enhance road safety and awareness of emergency vehicles 120.

Figure 2:
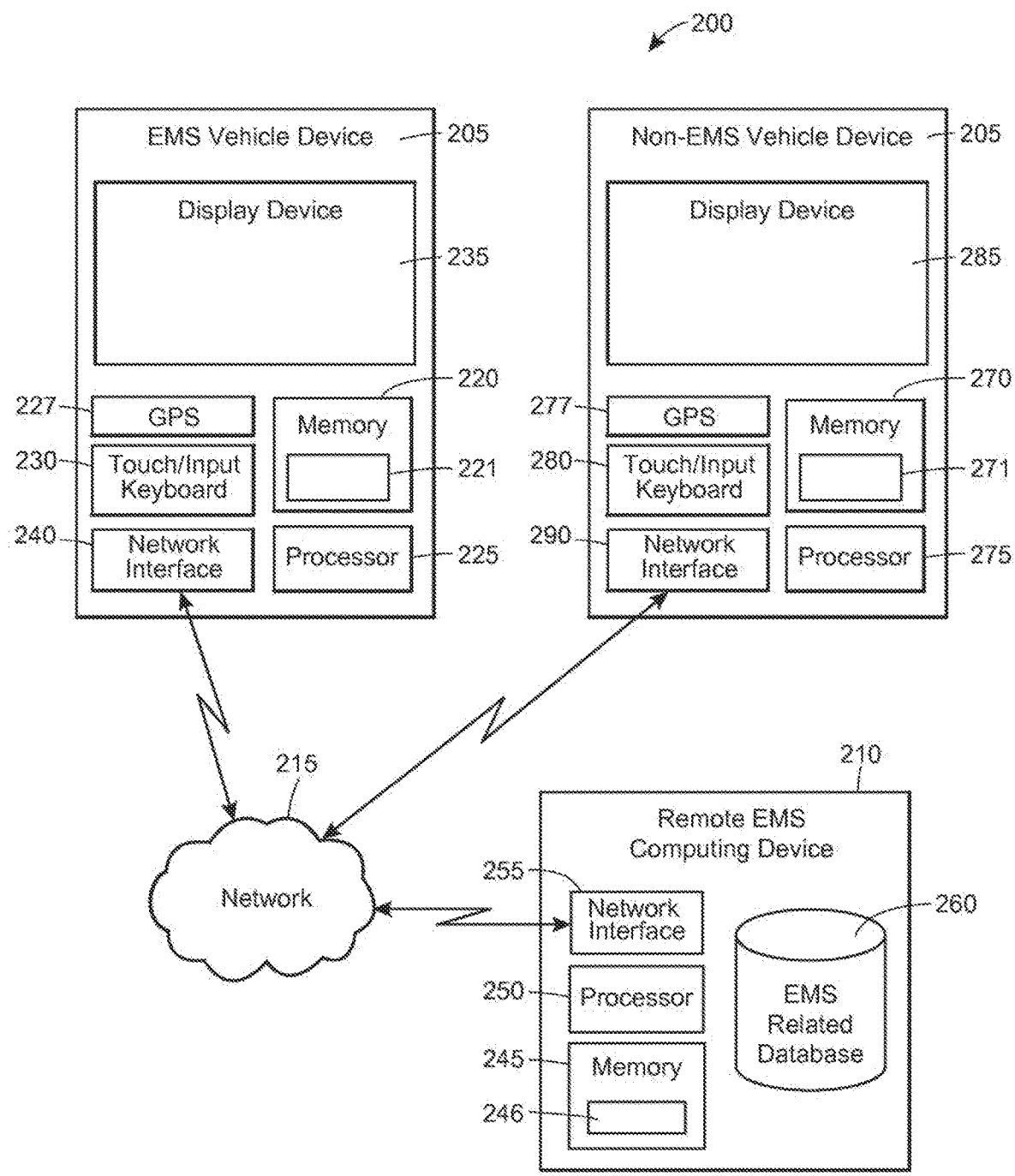
FIG. 2 depicts a high-level block diagram for an exemplary computer system for generating emergency vehicle warning data and/or insurance-related data based upon the emergency vehicle warning data.

Exemplary System for Generating Emergency Vehicle Warning Data and/or Insurance-Related Data Turning to FIG. 2, a computer system for generating emergency vehicle warning data 200 may include an emergency vehicle device 205 and a non-emergency vehicle device 265 in communication with a remote emergency management services computer device 210 via a communications network 215. The computer system 200 may implement communications between the emergency vehicle device 205, the non-emergency vehicle device 265, and the remote emergency management services device 210 to provide, for example, emergency vehicle warning data to an emergency management services related database 260. For example, the computer system 200 may acquire emergency vehicle data from, for example, a user of an emergency vehicle device 205 and/or non-emergency vehicle data from, for example, a user of a non-emergency vehicle device 265. As described in detail herein, the computer system 200 may automatically generate emergency vehicle warning data based upon, for example, emergency vehicle data and/or non-emergency vehicle data.

For clarity, only one emergency vehicle device 205, one non-emergency vehicle device 265, and one remote emergency management services device 210 are depicted in FIG. 2. While FIG. 2 depicts only one emergency vehicle device 205, one non-emergency vehicle device 265, and one remote emergency management services device 210, it should be understood that any number of emergency vehicle devices 205, any number of non-emergency vehicle devices 265, and any number of remote emergency management services computing devices may be supported, and that each emergency vehicle device 205, each non-emergency vehicle device 265, and each remote emergency management services computing device 210 may be any appropriate computing device, such as a mobile telephone, a personal data assistant, a tablet or a lap-top computer.

An emergency vehicle device 205 may include a memory 220 and a processor 225 for storing and executing, respectively, a module 221. The module 221, stored in the memory 220 as a set of computer-readable instructions, may be related to an application for generating emergency vehicle warning data, and/or insurance-related data, based upon emergency vehicle data and/or non-emergency vehicle data that, when executed on a processor 225, causes data representative of emergency vehicle warning data and/or insurance-related data based upon emergency vehicle data and/or non-emergency vehicle data to be stored in the memory 220. As described in detail herein, the module 221 may facilitate interaction between an associated emergency vehicle device 205, a non-emergency vehicle device 265, and/or a remote emergency management services computing device 210. The processor 225, further executing the module 221, may facilitate communications between a remote emergency management services computing device 210, an emergency vehicle device 205, and/or a non-emergency vehicle device 265 via a network interface 240 and a network 215.

An emergency vehicle device 205 may include a global positioning system (GPS) 227. An emergency vehicle device 205 may include a display device 235 which may be any type of electronic display device such as a liquid crystal display (LCD), a light emitting diode (LED) display, a plasma display, a cathode ray tube (CRT) display, or any other type of known or suitable electronic display. A display device 235 may exhibit a display which depicts a user interface for configuring an emergency vehicle device 205 to communicate with a non-emergency vehicle device 265 and/or a remote emergency management services computing device 210. An emergency vehicle device 205 may include a user input device 230, such as a touch input/keyboard/pointing device (e.g., a mouse) that provides a mechanism for a user of the emergency vehicle device 205 to launch an emergency vehicle device insurance application and, for example, to interact with a system for generating emergency vehicle warning data, and/or insurance-related data, based upon emergency vehicle data and/or non-emergency vehicle data. The user input device 230 may be configured as an integral part of a display device 235, such as a touch screen display device.

The network interface 240 may be configured to facilitate communications between an emergency vehicle device 205, a non-emergency vehicle device 265, and/or a remote emergency management services computing device 210 via any wireless communication network 215, including for example a peer-to-peer communications link, wireless LAN, MAN or WAN, WiFi, the Internet, or any combination thereof. Moreover, an emergency vehicle device 205 may be communicatively connected to a remote emergency management services device 210 via any suitable communication system, such as via any publicly available or privately owned communication network, including those that use wireless communication structures, such as wireless communication networks, including for example, a peer-to-peer communications link, wireless LANs and WANs, satellite and cellular telephone communication systems, etc. An emergency vehicle device 205 may cause, for example, emergency vehicle data and/or emergency vehicle warning data to be transmitted to, and stored in, for example, a remote emergency management services computing device 210 memory 245 and/or a remote emergency management services related database 260.

A non-emergency vehicle device 265 may include a memory 270 and a processor 275 for storing and executing, respectively, a module 271. The module 271, stored in the memory 270 as a set of computer-readable instructions, may be related to an application for generating non-emergency vehicle warning data, and/or insurance-related data, based upon non-emergency vehicle data and/or emergency vehicle data that, when executed on a processor 275, causes data representative of non-emergency vehicle warning data and/or insurance-related data based upon emergency vehicle data and/or non-emergency vehicle data to be stored in the memory 270. As described in detail herein, the module 271 may facilitate interaction between an associated non-emergency vehicle device 265, an emergency vehicle device 205, and/or a remote emergency management services computing device 210. The processor 275, further executing the module 271, may facilitate communications between a remote emergency management services computing device 210, a non-emergency vehicle device 265, and/or an emergency vehicle device 205 via a network interface 290 and a network 215.

A non-emergency vehicle device 265 may include a global positioning system (GPS) 277. A non-emergency vehicle device 265 may include a display device 285 which may be any type of electronic display device such as a liquid crystal display (LCD), a light emitting diode (LED) display, a plasma display, a cathode ray tube (CRT) display, or any other type of known or suitable electronic display. A display device 285 may exhibit a display which depicts a user interface for configuring a non-emergency vehicle device 265 to communicate with an emergency vehicle device 205 and/or a remote emergency management services computing device 210. A non-emergency vehicle device 265 may include a user input device 280, such as a touch input/keyboard/pointing device (e.g., a mouse) that provides a mechanism for a user of the non-emergency vehicle device 265 to launch a non-emergency vehicle device insurance application and, for example, to interact with a system for generating emergency vehicle warning data, and/or insurance-related data, based upon emergency vehicle data and/or non-emergency vehicle data. The user input device 280 may be configured as an integral part of a display device 285, such as a touch screen display device.

The network interface 290 may be configured to facilitate communications between a non-emergency vehicle device 265, an emergency vehicle device 205, and/or a remote emergency management services computing device 210 via any wireless communication network 215, including for example a peer-to-peer communications link, wireless LAN, MAN or WAN, WiFi, the Internet, or any combination thereof. Moreover, a non-emergency vehicle device 265 may be communicatively connected to a remote emergency management services device 210 via any suitable communication system, such as via any publicly available or privately owned communication network, including those that use wireless communication structures, such as wireless communication networks, including for example, a peer-to-peer communications link, wireless LANs and WANs, satellite and cellular telephone communication systems, etc. A non-emergency vehicle device 265 may cause, for example, non-emergency vehicle data to be transmitted to, and stored in, for example, a remote emergency management services computing device 210 memory 245 and/or a remote emergency management services related database 260.

A remote emergency management services computing device 210 may include a memory 245 and a processor 250 for storing and executing, respectively, a module 246. The module 246, stored in the memory 245 as a set of computer-readable instructions, may facilitate applications related to generating emergency vehicle warning data, and/or insurance-related data, based upon emergency vehicle data and/or non-emergency vehicle data. The module 246 may also facilitate communications between the remote emergency management services computing device 210, an emergency vehicle device 205, and/or a non-emergency vehicle device 265 via a network interface 255 and the network 215, and other functions and instructions.

A remote emergency management services device 210 may be communicatively coupled to an emergency management services related database 260. While the emergency management services related database 260 is shown in FIG. 2 as being communicatively coupled to the remote emergency management services device 210, it should be understood that the emergency management services related database 260 may be located within separate remote servers (or any other suitable computing devices) communicatively coupled to the remote emergency management services computer device 210. Optionally, portions of emergency management services related database 260 may be associated with memory modules that are separate from one another, such as a memory 220 of an emergency vehicle device 205 and/or a non-emergency vehicle device 265.

Figure 3:
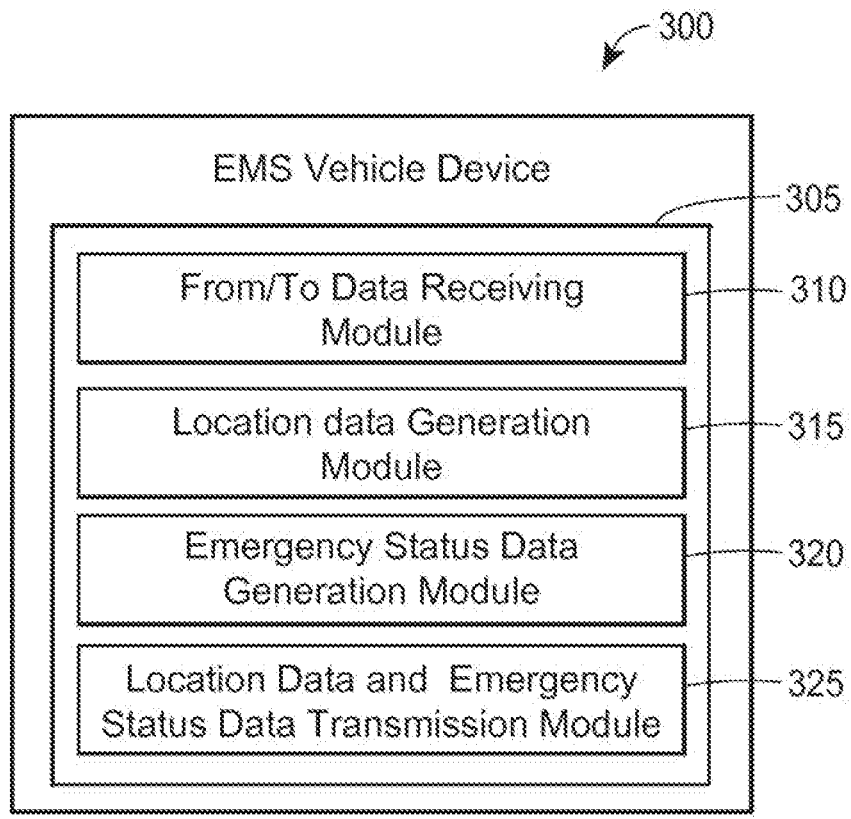
FIG. 3 depicts a block diagram for an exemplary emergency vehicle device for generating emergency vehicle data and/or emergency vehicle warning data.

Exemplary Emergency Vehicle Device for Generating Emergency Vehicle Data and/or Emergency Vehicle Warning Data Turning to FIG. 3, an emergency vehicle device 300 may include a from/to data receiving module 310, a location data generation module 315, an emergency status data generation module 320, and/or a location and emergency status data transmission module 325 stored on, for example, a memory 305. The emergency vehicle device 300 may be similar to the emergency vehicle device 205 of FIG. 2, and/or may include additional, less, or alternate functionality, including that discussed elsewhere herein.

Figure 4:
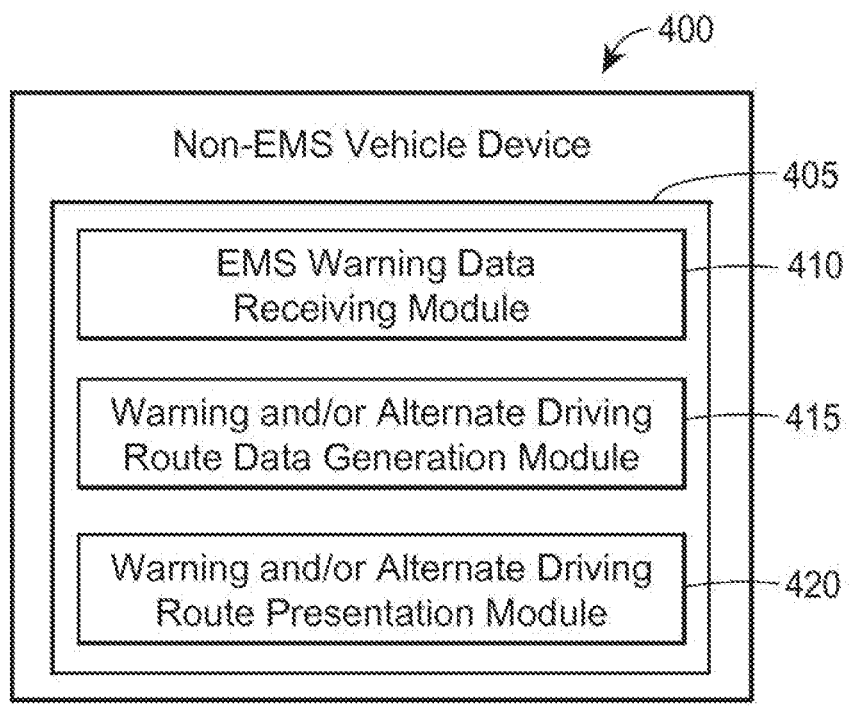
FIG. 4 depicts a block diagram for an exemplary non-emergency vehicle device for generating non-emergency vehicle data and/or emergency vehicle warning data.

Exemplary Non-Emergency Vehicle Device for Generating Non-Emergency Vehicle Data and/or Emergency Vehicle Warning Data Turning to FIG. 4, a non-emergency vehicle device 400 may include an emergency vehicle warning data receiving module 410, a warning and/or alternate driving route data generation module 415, and/or a warning and/or alternate driving route presentation module 420 stored on, for example, a memory 405. The non-emergency vehicle device 400 may be similar to the non-emergency vehicle device 265 of FIG. 2, and/or may include additional, less, or alternate functionality, including that discussed elsewhere herein.

Figure 5:
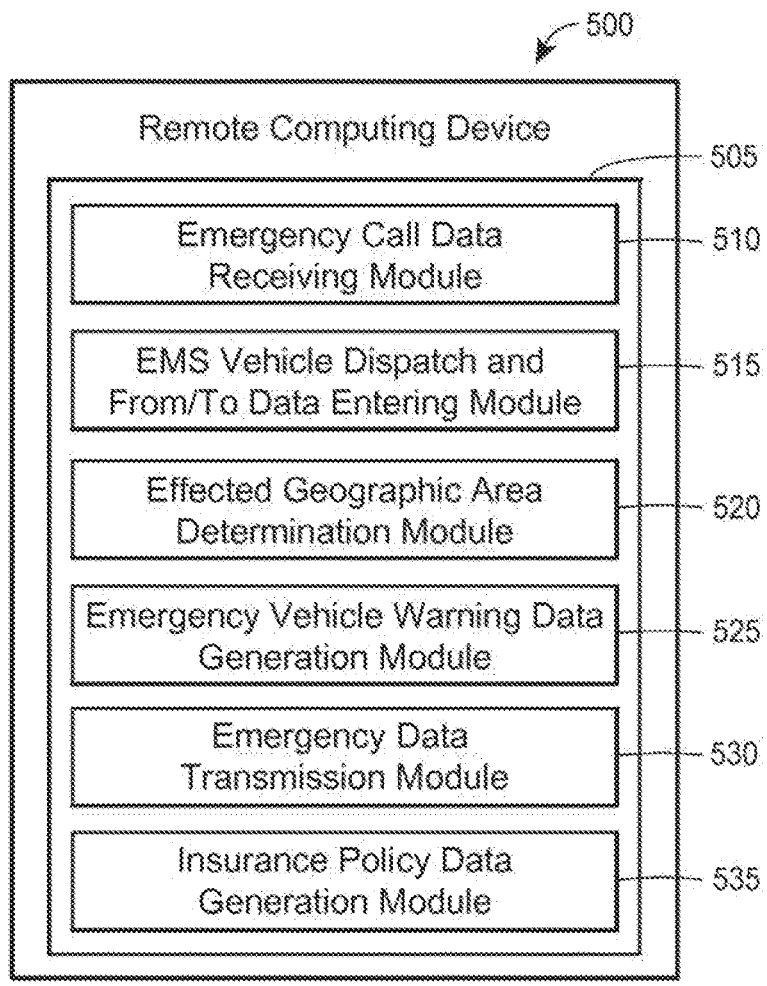
FIG. 5 depicts a block diagram for an exemplary remote emergency management services computing device for generating emergency vehicle warning data and/or insurance policy related data based upon the emergency vehicle warning data.

Exemplary Remote Emergency Management Services Computing Device for Generating Emergency Vehicle Warning Data, and Insurance-Related Data With reference to FIG. 5, a remote emergency management services computing device 500 may include an emergency call data receiving module 510, an emergency vehicle dispatch and from/to data entering module 515, an effected geographic area determination module 520, an emergency vehicle warning data generation module 525, an emergency vehicle warning data transmission module 530, and/or an insurance-related data generation module 535 stored on, for example, a memory 505. The remote emergency management services computing device 500 may be similar to, for example, the remote emergency management services computing device 210 of FIG. 2, and/or may include additional, less, or alternate functionality, including that discussed elsewhere herein.

Figure 6:
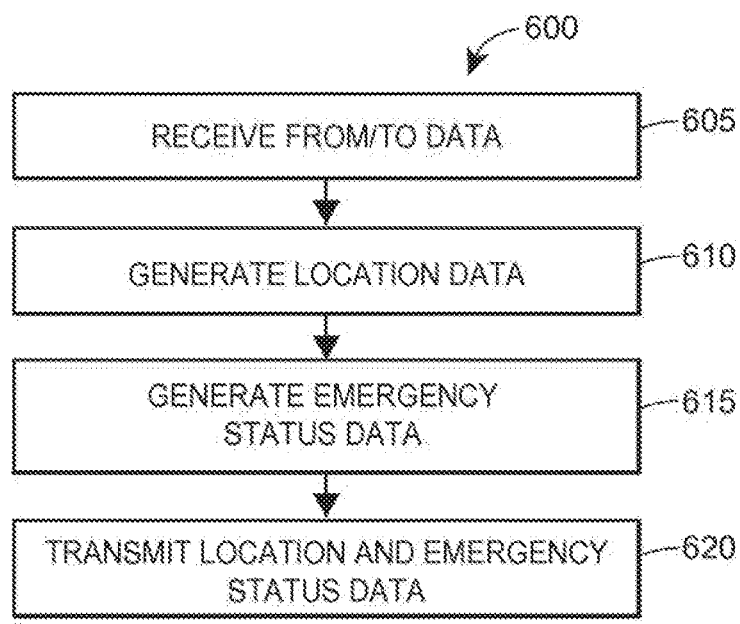
FIG. 6 depicts a flow diagram for an exemplary method for generating emergency vehicle data and/or emergency vehicle warning data.

Exemplary Method for Generating Emergency Vehicle Data and/or Emergency Vehicle Warning Data Turning to FIG. 6, a method of automatically generating emergency vehicle data 600 may be implemented by a processor (e.g., processor 225 of emergency vehicle device 205 of FIG. 2) executing, for example, modules 310-320 of FIG. 3. In particular, processor 225 may execute the from/to data receiving module 310 to cause the processor 225 to receive to/from data from, for example, a processor of a remote emergency management services computer (e.g., processor 250) (block 605). The processor 225 may execute the location data generation module 315 to cause the processor 225 to generate emergency vehicle location data based upon, for example, a global positioning system (GPS) 227 signal (block 610). The processor 225 may execute the emergency status data generation module 320 to cause the processor 225 to generate emergency status data (block 615). The emergency status data may be indicative of whether an associated emergency vehicle is, for example, currently in motion, or is currently stationary.

The processor 225 may execute the location and emergency status data transmission module 325 to cause the processor 225 to transmit emergency vehicle data to, for example, a processor of a remote emergency management services computing device (e.g., processor 250) and/or to a processor of a non-emergency vehicle device (e.g., processor 275) (block 620). The emergency vehicle data may be based upon, for example, the location data and/or the emergency status data. For example, the emergency vehicle data may be representative of an emergency vehicle origination location, an emergency vehicle current location, an emergency vehicle route, and/or an emergency vehicle destination location.

Additionally, or alternatively, the processor 225 may execute an emergency vehicle warning data generation module 525 to generate emergency vehicle warning data (and/or alternate routing information) based upon, for example, emergency vehicle data and/or non-emergency vehicle data. When the processor 225 generates emergency vehicle warning data (and/or alternate routing information), the processor 225 may transmit the emergency vehicle warning data in addition to, or in lieu of, the emergency vehicle data, to, for example, a processor of a remote emergency management services computing device (e.g., processor 250) and/or to a processor of a non-emergency vehicle device (e.g., processor 275) (block 620). The method may include additional, fewer, or alternate actions, including those discussed elsewhere herein.

Figure 7:
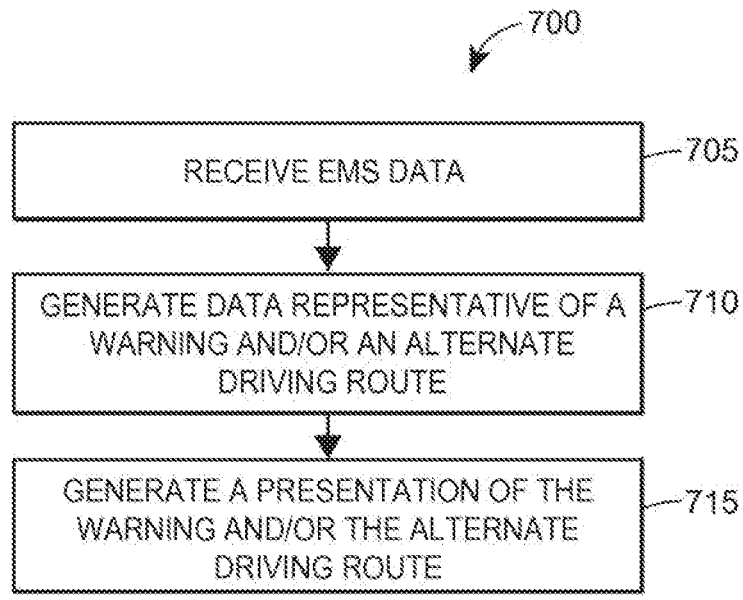
FIG. 7 depicts a flow diagram for an exemplary method for generating non-emergency vehicle data and/or emergency vehicle warning data.

Exemplary Method for Generating Non-Emergency Vehicle Data and/or Emergency Vehicle Warning Data With reference to FIG. 7, a method of automatically generating non-emergency vehicle data 500 may be implemented by a processor (e.g., processor 275 of non-emergency vehicle device 265 of FIG. 2) executing, for example, modules 410-420 of FIG. 4. In particular, processor 275 may execute an emergency vehicle warning data receiving module 410 to receive emergency vehicle warning data from, for example, a processor of a remote emergency management services computing device (e.g., processor 250) and/or a processor of an emergency vehicle device (e.g., processor 225) (block 705). The processor 275 may execute a warning and/or alternate driving route data generation module 415 to cause the processor 275 to generate warning data and/or alternate driving route data based upon the emergency vehicle warning data (block 710).

The processor 275 may execute a warning and/or alternate driving route presentation module 420 to cause the processor 275 to generate a presentation of a warning based upon the warning data and/or a presentation of an alternate driving route based upon the alternate driving route data (block 715). The presentation of the warning may be, for example, a visual alarm, a motion alarm (e.g., vibration of a seat or steering wheel) and/or an audible alarm, and may be indicative of an emergency vehicle being in a geographic area of the non-emergency vehicle.

The presentation of the alternate driving route may be, for example, a visual presentation and/or an audible presentation, and may be indicative of a driving route that will avoid intersection with an emergency vehicle. The processor 275 may execute a module (e.g., a module location data generation module 315) to cause the processor 275 to generate non-emergency vehicle location data based, for example, upon an output of a sensor (e.g., GPS 277 of FIG. 2). The method may include additional, fewer, or alternate actions, including those discussed elsewhere herein.

Figure 8:
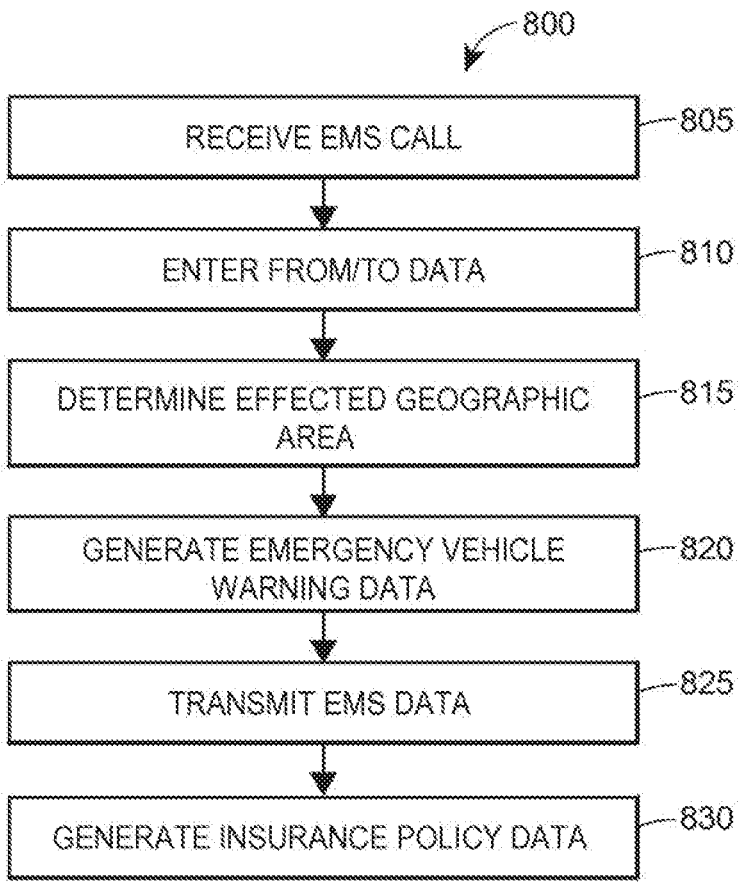
FIG. 8 depicts a flow diagram for an exemplary method for generating emergency vehicle warning data and/or insurance policy related data based upon the emergency vehicle warning data.

Exemplary Method for Generating Emergency Vehicle Warning Data and/or Insurance-Related Data Turning to FIG. 8, a method of automatically generating emergency vehicle warning data and/or insurance-related data 800 may be implemented by a processor (e.g., processor 250 of remote emergency management services computing device 210 of FIG. 2) executing, for example, modules 510-535 of FIG. 5. In particular, the processor 250 may execute the emergency call data receiving module 510 to cause the processor 250 to receive emergency call data (block 805). For example, the emergency call data may be automatically entered into the remote emergency management services computing device 210 when the individual seeking emergency services calls into a remote location (e.g., remote location) and enters information via, for example, a telephone. The emergency call data may be representative of information received by, for example, an emergency management services dispatcher from an individual seeking emergency services (e.g., medical, fire, police, etc.). Alternatively, the processor 250 may execute an emergency management system vehicle dispatch and from/to data entering module 520 such that a dispatcher may enter the emergency call data into, for example, a remote emergency management services computing device (e.g., remote emergency management services computing device 210 of FIG. 2) via, for example, a user input device (e.g., a keyboard, a touch screen, a voice actuated system, etc.) (block 810).

The processor 250 may execute the effected geographic area determination module 520 to cause the processor 250 to generate effected geographic area data based upon the emergency call data (block 815). The effected geographic area data may be representative of a geographic area in which an emergency vehicle will travel, an emergency vehicle origination location, an emergency vehicle driving route, and/or an emergency vehicle destination location. The processor 250 may execute the emergency vehicle warning data generation module 525 to cause the processor 250 to generate emergency vehicle warning data based upon emergency vehicle data and/or non-emergency vehicle data (block 820). The processor 250 may execute the emergency management services data transmission module 530 to cause the processor 250 to transmit emergency vehicle data and/or emergency vehicle warning data to a processor of a non-emergency vehicle device (e.g., processor 275 of FIG. 2) and/or a processor of an emergency vehicle device (e.g., processor 225 of FIG. 2) (block 825).

The processor 250 may execute an insurance-related data generation module 535 to cause the processor 250 to generate insurance-related data based upon the emergency vehicle data, the non-emergency vehicle data, and/or the emergency vehicle warning data (block 830). The insurance-related data may be, for example, representative of whether an emergency vehicle includes an emergency vehicle device (e.g., emergency vehicle device 205 of FIG. 2) and/or a non-emergency vehicle includes a non-emergency vehicle device (e.g., non-emergency vehicle device 265 of FIG. 2).

In particular, the insurance-related data may be representative of a lower insurance risk for an emergency vehicle that includes an emergency vehicle device 205 compared to an emergency vehicle that does not include an emergency vehicle device 205. Furthermore, the insurance-related data may be representative of a lower insurance risk for a non-emergency vehicle that includes a non-emergency vehicle device 265 compared to a non-emergency vehicle that does not include a non-emergency vehicle device 205. The method may include additional, less, or alternate functionality, including that discussed elsewhere herein.

Exemplary Computer Implemented Method

In one aspect, a computer implemented method for generating data representative of an emergency vehicle warning may be provided. The method may include (1) receiving, at a processor of a computing device, emergency vehicle data, in response to the processor executing an emergency vehicle data receiving module. The emergency vehicle data may be representative of at least one of: emergency vehicle origination location data, emergency vehicle current location data, emergency vehicle route data, and emergency vehicle destination location data. The method may also include (2) receiving, at a processor of a computing device, non-emergency vehicle data, in response to the processor executing a non-emergency vehicle data receiving module. The non-emergency vehicle data may be representative of at least one of: non-emergency vehicle origination location data, non-emergency vehicle current location data, non-emergency vehicle route data, and non-emergency vehicle destination location data. The method may further include (3) generating, using a processor of a computing device, emergency vehicle warning data, based upon the emergency vehicle data and the non-emergency vehicle data, in response to the processor executing an emergency vehicle warning data generation module.

The method may yet further include (4) generating, using a processor of a computing device, insurance-related data, based upon the emergency vehicle warning data, in response to the processor executing an insurance-related data generation module. The insurance-related data may be representative of an insurance risk associated with a non-emergency vehicle, and the insurance risk may be lower for a non-emergency vehicle that is equipped with an emergency vehicle warning data receiving device. The insurance-related data may be representative of an insurance risk associated with an emergency vehicle, and an insurance risk may be lower for an emergency vehicle that is equipped with an emergency vehicle warning data generation and receiving device.

The method may include (5) transmitting, using a processor of a computing device, emergency vehicle warning data, to a non-emergency vehicle, in response to the processor executing an emergency vehicle warning data transmission module. The method may include (6) transmitting, using a processor of a computing device, emergency vehicle data, from an emergency vehicle to a non-emergency vehicle, in response to the processor executing an emergency vehicle data transmission module. The method may include additional, less, or alternate actions, including that discussed elsewhere herein.

Exemplary System

A system for generating emergency vehicle warning data (and/or alternate routing data) may be provided. The system may include an emergency vehicle data receiving module stored on a memory that, when executed by a processor of a computing device, may cause the processor to receive emergency vehicle data. The emergency vehicle data may be representative of at least one of: emergency vehicle origination location data, emergency vehicle current location data, emergency vehicle route data, and/or emergency vehicle destination location data. The system may also include a non-emergency vehicle data receiving module stored on a memory that, when executed by a processor of a computing device, may cause the processor to receive non-emergency vehicle data. The non-emergency vehicle data may be representative of at least one of: non-emergency vehicle origination location data, non-emergency vehicle current location data, non-emergency vehicle route data, and/or non-emergency vehicle destination location data. The system may further include an emergency vehicle warning data (and/or alternate routing data) generation module stored on a memory that, when executed by a processor of a computing device, may cause the processor to generate emergency vehicle warning data (and/or alternate routing data), based upon the emergency vehicle data and the non-emergency vehicle data. The system may include additional, less, or alternate functionality, including that discussed elsewhere herein.

For instance, the system may include an insurance-related data generation module stored on a memory that, when executed by a processor of a computing device, may cause the processor to generate insurance-related data, based upon the emergency vehicle warning data (and/or alternate routing data). The insurance-related data may be representative of an insurance risk associated with a non-emergency vehicle, and the insurance risk may be lower for a non-emergency vehicle that is equipped with an emergency vehicle warning data (and/or alternate routing data) receiving device, and/or the insurance-related data may be representative of an insurance risk associated with an emergency vehicle, and the insurance risk may be lower for an emergency vehicle that is equipped with an emergency vehicle warning data (and/or alternate routing data) generation and receiving device.

The system may also include an emergency vehicle data transmission module stored on a memory that, when executed by a processor of a computing device, may cause the processor to transmit emergency vehicle data (and/or associated alternate routing data) from an emergency vehicle to a non-emergency vehicle via a point-to-point communication link.

The system may also include an emergency vehicle warning data (and/or alternate routing data) transmission module stored on a memory that, when executed by a processor of a computing device, may cause the processor to transmit emergency vehicle warning data (and/or alternate routing data) from a processor of a remote emergency management services device to a non-emergency vehicle via a cellular telephone network.

The emergency vehicle data receiving module, the non-emergency vehicle data receiving module, and the emergency vehicle warning data generation module may be executed by a processor of a remote emergency management services device, and the remote emergency management services device may include an insurance-related data generation module stored on a memory that, when executed by the processor of the remote emergency management services device, may cause the processor to generate insurance-related data, based upon the emergency vehicle warning data.

Exemplary Computer-Readable Instructions

A non-transitory computer-readable medium storing instructions that, when executed by a processor of a computing device, may cause the processor to automatically generate personal article insurance data may include an emergency vehicle data receiving module that, when executed by a processor of a computing device, may cause the processor to receive emergency vehicle data. The emergency vehicle data may be representative of at least one of: emergency vehicle origination location data, emergency vehicle current location data, emergency vehicle route data, and/or emergency vehicle destination location data.

The non-transitory computer-readable medium may also include a non-emergency vehicle data receiving module that, when executed by a processor of a computing device, may cause the processor to receive non-emergency vehicle data. The non-emergency vehicle data may be representative of at least one of: non-emergency vehicle origination location data, non-emergency vehicle current location data, non-emergency vehicle route data, and/or non-emergency vehicle destination location data.

The non-transitory computer-readable medium may further include an emergency vehicle warning data generation module that, when executed by a processor of a computing device, may cause the processor to generate emergency vehicle warning data (and/or alternate routing information), based upon the emergency vehicle data and the non-emergency vehicle data. The non-transitory computer-readable medium may include an emergency vehicle warning (and/or alternate routing) presentation module that, when executed by a processor of a computing device, may cause the processor to generate an emergency vehicle warning and/or alternate routing) presentation based upon the emergency vehicle warning data. The non-transitory computer-readable medium may include an insurance-related data generation module that, when executed by a processor of a computing device, may cause the processor to generate insurance-related data based upon the emergency vehicle warning data.

The non-transitory computer-readable medium may include an emergency vehicle data transmission module that, when executed by a processor of a computing device, may cause the processor to transmit emergency vehicle data from a first emergency vehicle to a second emergency vehicle. The non-transitory computer-readable medium may include an emergency vehicle warning data transmission module that, when executed by a processor of a computing device, may cause the processor to transmit emergency vehicle warning data from the processor to an emergency vehicle.

Additionally or alternatively, the non-transitory computer-readable medium may include a non-emergency vehicle alternate route presentation module that, when executed by a processor of a computing device, may cause the processor to generate a non-emergency vehicle alternate route presentation based upon the emergency vehicle warning data.

The non-transitory computer-readable medium may include an effected geographic area data generation module that, when executed by a processor of a computing device, may cause the processor to generate effected geographic area data based upon the emergency vehicle data, and/or an emergency vehicle data warning transmission module that, when executed by a processor of a computing device, may cause the processor to transmit emergency vehicle warning data and/or alternate routing data to non-emergency vehicles based upon the effected geographic area data.

The non-transitory computer-readable medium may include an emergency vehicle data transmission module that, when executed by a processor of a computing device, may cause the processor to transmit emergency vehicle data to a non-emergency vehicle. The non-transitory computer-readable medium may include an emergency vehicle warning data transmission module that, when executed by a processor of a computing device, may cause the processor to transmit emergency vehicle warning data from the processor to a non-emergency vehicle.

Exemplary Computer Implemented Method

In one aspect, a computer implemented method for generating data representative of an emergency vehicle warning and/or alternate vehicle route may be provided. The method may include (1) receiving, generating, or collecting, via or at one or more processors (such as processors associated with an emergency vehicle, non-emergency vehicle, and/or remote servers), emergency vehicle data via wireless communication and/or data transmission, wherein the emergency vehicle data is representative of: emergency vehicle origination location data, emergency vehicle current location data, emergency vehicle route data, emergency vehicle destination location data, and/or type of emergency; (2) receiving, generating, or collecting, via or at the one or more processors (such as processors associated with an emergency vehicle, non-emergency vehicle, and/or remote servers), non-emergency vehicle data, wherein the non-emergency vehicle data is representative of: non-emergency vehicle origination location data, non-emergency vehicle current location data, non-emergency vehicle route data, and/or non-emergency vehicle destination location data; (3) receiving or generating, via or at the one or more processors (such as processors associated with an emergency vehicle, non-emergency vehicle, and/or remote servers), emergency vehicle warning data and/or alternate vehicle route data based upon computer analysis and/or comparison of the emergency and non-emergency vehicle data, the alternate vehicle route (i) directing the non-emergency vehicle out of the way of the emergency vehicle, (ii) avoids the route of the emergency vehicle, and/or (iii) alleviates an amount that the non-emergency vehicle interferes with a route of the emergency vehicle; and/or (4) causing, via or at the one or more processors (such as processors associated with an emergency vehicle, non-emergency vehicle, and/or remote servers), the emergency vehicle warning data and/or alternate vehicle route data, to be presented or provided to a driver of the non-emergency vehicle to facilitate alleviating potential vehicle accidents between emergency response and non-emergency response vehicles, and/or shortening emergency response times for emergency vehicles. The method may include additional, less, or alternate actions, including those discussed elsewhere herein, and/or the method may be implemented via a computer system, communication network, one or more processors, and/or computer-executable instructions stored on non-transitory storage media or computer-readable medium.

For instance, the method may include generating, via the one or more processors, insurance-related data for the driver of the non-emergency vehicle based upon the driver following recommendations associated with emergency vehicle warnings and/or alternate vehicle routing to avoid emergency vehicles. The insurance-related data may be representative of an insurance risk associated with a non-emergency vehicle, and the insurance risk may be lower for a non-emergency vehicle that is equipped with an emergency vehicle warning data receiving device. The insurance-related data may be representative of an insurance risk associated with an emergency vehicle, and the insurance risk may be lower for an emergency vehicle that is equipped with an emergency vehicle warning data generation, transmitting, and/or receiving device.

The method may include transmitting, via the one or more processors, emergency vehicle warning data and/or alternate vehicle route data to other vehicles or processors. The one or more processors may be mounted on an autonomous or smart vehicle, and the autonomous or smart vehicle automatically may direct or drive itself to take an alternate vehicle route and/or take self-driving actions that allow the autonomous or smart vehicle avoid the emergency vehicle and/or a route of the emergency vehicle.

Exemplary Vehicle-Mounted Systems

In one aspect, a vehicle-mounted system of a vehicle for generating emergency vehicle warning data and/or alternate route data may be provided. The system may include one or more processors configured to: (1) receive emergency vehicle data, wherein the emergency vehicle data is representative of: emergency vehicle origination location data, emergency vehicle current location data, emergency vehicle route data, emergency vehicle destination location data, and/or alternate routing (2) collect non-emergency vehicle data, the non-emergency vehicle data associated with the vehicle and being generated by one or more vehicle-mounted sensors or processors, the non-emergency vehicle data is representative: non-emergency vehicle origination location data, non-emergency vehicle current location data, non-emergency vehicle route data, and/or non-emergency vehicle destination location data; (3) generate an emergency vehicle warning and/or alternate route based upon computer analysis and/or comparison of the emergency vehicle data and the non-emergency vehicle data; and/or (4) present the emergency vehicle warning and/or alternate route to the driver of the vehicle such that driver of the vehicle, or the vehicle itself, may avoid may avoid the route of the emergency vehicle and/or to facilitate shortening response time for emergency vehicles.

The system may include additional, less, or alternate functionality, including that discussed elsewhere herein. For instance, the vehicle may be an autonomous vehicle that automatically avoids the route of the emergency vehicle based upon computer comparison or analysis of the emergency and non-emergency vehicle data.

The system may further include an insurance-related data generation module stored on a memory that, when executed by a processor of a computing device, causes the processor to generate insurance-related data, based upon the emergency vehicle warning and/or alternate route data. The insurance-related data may be representative of an insurance risk associated with a non-emergency vehicle, and/or the insurance risk may be lower for a non-emergency vehicle that is equipped with an emergency vehicle warning data receiving device. Additionally or alternatively, the insurance-related data may be representative of an insurance risk associated with an emergency vehicle, and/or the insurance risk may be lower for an emergency vehicle that is equipped with an emergency vehicle warning data generation and receiving device.

Exemplary Non-Emergency Vehicle Implemented Method

In one aspect, a computer implemented method for generating data representative of an emergency vehicle warning and/or alternate vehicle route may be provided and/or may be performed by a non-emergency vehicle. The method may include (1) receiving, via or at one or more processors associated with a non-emergency vehicle, emergency vehicle data via wireless communication and/or data transmission, wherein the emergency vehicle data is representative of: emergency vehicle origination, current location, current speed, current heading, current route, and/or current destination, and/or type of emergency; (2) generating or collecting, via or at the one or more processors associated with the non-emergency vehicle, non-emergency vehicle data (such as from one or more vehicle-mounted sensors), wherein the non-emergency vehicle data is representative of: non-emergency vehicle origination, current location, current speed, current heading, current route, and/or current destination; (3) generating, via or at the one or more processors associated with the non-emergency vehicle, emergency vehicle warning data and/or alternate vehicle route data based upon computer analysis and/or comparison of the emergency and non-emergency vehicle data that is performed by the one or more processors associated with the non-emergency vehicle, the alternate vehicle route (i) directing the non-emergency vehicle out of the way of the emergency vehicle, (ii) avoids the route of the emergency vehicle, and/or (iii) alleviates an amount that the non-emergency vehicle interferes with a route of the emergency vehicle; and/or (4) causing, via or at the one or more processors associated with the non-emergency vehicle, the emergency vehicle warning data and/or alternate vehicle route data, to be presented or provided to a driver of the non-emergency vehicle to facilitate alleviating potential vehicle accidents between emergency response and non-emergency response vehicles, and/or shortening emergency response times for emergency vehicles.

The method may further include adjusting an insurance policy, premium, rate, or discount for the non-emergency vehicle based upon the non-emergency vehicle having the vehicle warning and/or alternate vehicle route generation functionality. The method may include additional, less, or alternate functionality, including that discussed elsewhere herein, and/or the method may be implemented via a computer system, communication network, one or more processors, and/or computer-executable instructions stored on non-transitory storage media or computer-readable medium.

Exemplary Autonomous Vehicle Implemented Method

In one another aspect, a computer implemented method for generating data representative of an emergency response vehicle warning and/or alternate vehicle route may be provided. The method may include (1) receiving, via or at one or more processors mounted on an autonomous, non-emergency response vehicle, emergency response vehicle data via wireless communication and/or data transmission, wherein the emergency response vehicle data is representative of: emergency response vehicle origin, current location, current speed, current heading, current route, and/or current destination, and/or type of emergency, such as a vehicle accident or weather event; (2) generating or collecting, via or at the one or more processors mounted on the autonomous, non-emergency response vehicle, non-emergency response vehicle data associated with the autonomous, non-emergency response vehicle, wherein the non-emergency response vehicle data is representative of: the autonomous, non-emergency response vehicle origination, current location, current speed, current heading, current route, and/or current destination; (3) generating, via or at the one or more processors mounted on the autonomous, non-emergency response vehicle, emergency response vehicle warning data and/or alternate vehicle route data based upon computer analysis and/or comparison of the emergency response and non-emergency response vehicle data that is performed by the one or more processors mounted on the autonomous, non-emergency response vehicle, the alternate vehicle route (i) directing the autonomous, non-emergency response vehicle out of the way of the emergency response vehicle, (ii) avoids the route of the emergency response vehicle, and/or (iii) alleviates an amount that the autonomous, non-emergency response vehicle interferes with a route of the emergency response vehicle; and/or (4) causing, via or at the one or more processors mounted on the autonomous, non-emergency response vehicle, the autonomous, non-emergency response vehicle to automatically take the alternate route and/or present the emergency response vehicle warning to a passenger within the autonomous, non-emergency response vehicle to facilitate alleviating potential vehicle accidents between emergency response and non-emergency response vehicles, and/or shortening emergency response times for emergency response vehicles.

The method may further include adjusting an insurance policy, premium, rate, or discount for the autonomous, non-emergency response vehicle based upon the autonomous, non-emergency response vehicle having the vehicle warning and/or alternate vehicle route generation functionality. The method may include additional, less, or alternate functionality, including that discussed elsewhere herein, and/or the method may be implemented via a computer system, communication network, one or more processors, and/or computer-executable instructions stored on non-transitory storage media or computer-readable medium.

Exemplary Emergency Response Vehicle Implemented Method

In one aspect, a computer implemented method for generating data representative of an emergency response vehicle warning and/or alternate vehicle route may be provided. The method may include (1) generating or collecting, via or at one or more processors mounted on an emergency response vehicle, emergency response vehicle data (such as from vehicle-mounted sensors), wherein the emergency response vehicle data is representative of: emergency response vehicle origin, current location, current speed, current heading, current route, and/or current destination, and/or type of emergency, such as a vehicle accident or weather event; and/or (2) broadcasting or transmitting, via or at one or more processors or an associated transceiver mounted on the emergency response vehicle, the emergency response vehicle data, such as via wireless communication or data transmission, to non-emergency response vehicles or remote servers to facilitate one or more of the non-emergency response vehicles generating warnings associated with the emergency response vehicle and/or alternate routes to avoid the path of the emergency response vehicle to facilitate alleviating potential vehicle accidents between emergency response and non-emergency response vehicles, and/or shortening emergency response times for emergency response vehicles.

The method may further include adjusting an insurance policy, premium, rate, or discount for the emergency response vehicle based upon the non-emergency response vehicle having the emergency response vehicle data generation and/or broadcast functionality. The method may include additional, less, or alternate functionality, including that discussed elsewhere herein, and/or the method may be implemented via a computer system, communication network, one or more processors, and/or computer-executable instructions stored on non-transitory storage media or computer-readable medium.

Exemplary Warning and Alternate Route Generation

In one aspect, a computer implemented method for generating data representative of an emergency vehicle warning and/or alternate vehicle route may be provided. The method may include: (1) receiving, via or at one or more processors associated with, or mounted on, a non-emergency vehicle, emergency vehicle data via wireless communication or data transmission, wherein the emergency vehicle data is representative of: emergency vehicle (i) origination, (ii) current location, (iii) current speed, (iv) current heading, (v) current route, and/or (vi) current destination, and/or (vii) type of emergency, such as a vehicle accident, house fire, medical emergency, or weather event; (2) generating or collecting, via or at the one or more processors associated with, or mounted on, the non-emergency vehicle, non-emergency vehicle data from one or more vehicle-mounted sensors, wherein the non-emergency vehicle data is representative of: non-emergency vehicle (a) origination, (b) current location, (c) current speed, (d) current heading, (e) current route, and/or (f) current destination; (3) generating, via or at the one or more processors associated with, or mounted on, the non-emergency vehicle, emergency vehicle warning data and/or alternate vehicle route data based upon computer analysis or comparison of the emergency and non-emergency vehicle data that is performed by the one or more processors associated with the non-emergency vehicle, the alternate vehicle route directing the non-emergency vehicle to avoid the route of the emergency vehicle, or otherwise alleviates an amount that the non-emergency vehicle interferes with a route of the emergency vehicle; and/or (4)

causing, via or at the one or more processors associated with, or mounted on, the non-emergency vehicle, the emergency vehicle warning data and alternate vehicle route data, to be visually or audibly presented, or otherwise provided, to a driver of the non-emergency vehicle to facilitate alleviating potential vehicle accidents between emergency response and non-emergency response vehicles, and/or shortening emergency response times for emergency vehicles.

The method may also include adjusting an insurance policy, premium, rate, or discount for the non-emergency vehicle based upon the non-emergency vehicle having the vehicle warning and/or alternate vehicle route generation functionality. The non-emergency vehicle may be an autonomous or smart vehicle, and the autonomous or smart vehicle may automatically direct itself to take an alternate vehicle route and take self-driving actions that allow the autonomous or smart vehicle avoid the emergency vehicle or the route of the emergency vehicle.

The method may include adjusting an insurance policy, premium, rate, or discount for the autonomous, non-emergency response vehicle based upon the autonomous, non-emergency response vehicle having the vehicle warning and/or alternate vehicle route generation functionality. Additionally or alternatively, the method may include adjusting an insurance policy, premium, rate, or discount for the emergency response vehicle based upon the emergency response vehicle having the emergency response vehicle data generation and/or broadcast functionality.

The method may include generating, via the one or more processors mounted on the non-emergency vehicle, insurance policy data for the driver of the non-emergency vehicle based upon the driver following recommendations associated with emergency vehicle warnings or alternate vehicle routing that avoids emergency vehicles en route, and/or transmitting, via the one or more processors mounted on the non-emergency vehicle, to an insurance provider remote server to facilitate the insurance provider (or insurance provider remote server) providing auto insurance cost savings to the driver (or other insured or vehicle owner) based upon the insurance policy data and/or functionality associated with emergency vehicle avoidance. The method may include additional, less, or alternate functionality, including that discussed elsewhere herein, and/or the method may be implemented via a computer system, communication network, one or more processors, and/or computer-executable instructions stored on non-transitory storage media or computer-readable medium.

Exemplary Vehicle Mounted System

In another aspect, a vehicle-mounted system of a non-emergency vehicle for generating emergency vehicle warning data and/or alternate route data may be provided. The system may include one or more processors mounted on the non-emergency vehicle configured to: (1) receive emergency vehicle data via wireless communication or data transmission, the emergency vehicle data being representative of: emergency vehicle (i) origination location, (ii) current location data, (iii) route, (iv) destination, (v) speed, and/or (vi) alternate routing; (2) generate or collect non-emergency vehicle data, the non-emergency vehicle data associated with the non-emergency vehicle and being generated by one or more vehicle-mounted sensors or processors, the non-emergency vehicle data is representative of: non-emergency vehicle (a) origination location, (b) current location, (c) route, (d) destination, and/or (e) speed; (3) generate an alternate route based upon computer analysis or comparison of the emergency vehicle data and the non-emergency vehicle data; and/or (4) present the alternate route to the driver of the vehicle, or the vehicle itself, such that the driver of the vehicle, or the vehicle itself, may avoid the route of the emergency vehicle or that shortening of the response time for emergency vehicles is facilitated.

The non-emergency vehicle may be an autonomous vehicle that automatically avoids the route of the emergency vehicle based upon computer comparison or analysis of the emergency and non-emergency vehicle data. Additionally or alternatively, the emergency vehicle may be an autonomous vehicle that automatically avoids the route of the non-emergency vehicle based upon computer comparison or analysis of the emergency and non-emergency vehicle data.

The one or more processors mounted on the non-emergency vehicle may be further configured to: collect or generate, via the one or more processors mounted on the non-emergency vehicle, insurance policy data for the driver of the non-emergency vehicle based upon the driver following recommendations associated with emergency vehicle warnings or alternate vehicle routing that avoids emergency vehicles en route, and/or transmit, via the one or more processors mounted on the non-emergency vehicle, the insurance policy data to an insurance provider remote server to facilitate the insurance provider or insurance provider remote server providing auto insurance cost savings to the driver (or other insured or vehicle owner) based upon the insurance policy data and/or functionality associated with emergency vehicle avoidance.

The one or more processors mounted on the non-emergency vehicle may be further configured to: generate an emergency vehicle warning based upon computer analysis or comparison of the emergency vehicle data and the non-emergency vehicle data; and/or present the emergency vehicle warning to the driver of the vehicle such that the driver of the vehicle, or the vehicle itself, may avoid the route of the emergency vehicle or that shortening of the response time for emergency vehicles is facilitated. The vehicle-mounted system may include additional, less, or alternate actions, including those discussed elsewhere herein.

Additional Considerations

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A computer implemented method for generating data representative of an emergency vehicle warning and/or alternate vehicle route, the method comprising:
    receiving, via or at one or more processors mounted on a non-emergency vehicle, at a time when an associated emergency call is received, emergency vehicle data via wireless communication and/or data transmission, wherein the emergency vehicle data is representative of an emergency vehicle route that the emergency vehicle will travel, starting from a location of the emergency vehicle at the time when the associated emergency call is received and ending at a location of an associated emergency;
    determining emergency vehicle warning data and an alternate vehicle route data, via or at the one or more processors mounted on the non-emergency vehicle, wherein the alternate vehicle route directs the non-emergency vehicle to avoid the route of the emergency vehicle or otherwise alleviates an amount that the non-emergency vehicle interferes with the route of the emergency vehicle;
    causing, via or at the one or more processors mounted on the non-emergency vehicle, the emergency vehicle warning data and alternate vehicle route data, to be visibly or audibly presented, or otherwise provided, to a driver of the non-emergency vehicle;
    generating, via the one or more processors mounted on the non-emergency vehicle, insurance policy data for the driver of the non-emergency vehicle based upon the driver following recommendations associated with emergency vehicle warnings or alternate vehicle routing that avoids emergency vehicles en route; and
    transmitting, via the one or more processors mounted on the non-emergency vehicle, to an insurance provider remote server to facilitate the insurance provider providing auto insurance cost savings to the driver or other insured based upon the insurance policy data and/or functionality associated with emergency vehicle avoidance.

2. The computer implemented method of claim 1, wherein the vehicle warning data is representative of at least one of: an audible warning to stop, a visual warning to stop, an audible warning to move right, a visual warning to move right, an audible warning to move left, a visual warning to move left, an audible warning to move onto a shoulder of a road, a visual warning to move onto a shoulder of a road, an audible warning to merge to a right lane, a visual warning to merge to a right lane, or an audible warning to duplicate a siren tone.

3. The computer implemented method of claim 1, wherein the insurance policy data is representative of an insurance risk associated with a non-emergency vehicle, and the insurance risk is lower for a non-emergency vehicle that is equipped with an emergency vehicle warning data receiving device.

4. The computer implemented method of claim 1, wherein the insurance policy data is representative of an insurance risk associated with an emergency vehicle, and the insurance risk is lower for an emergency vehicle that is equipped with an emergency vehicle warning data generation, transmitting, and/or receiving device.

5. The computer implemented method of claim 1, further comprising:
    transmitting, via the one or more processors mounted on the non-emergency vehicle, emergency vehicle warning data and alternate vehicle route data to other vehicles or processors.

6. The computer implemented method of claim 1, wherein the non-emergency vehicle is an autonomous or smart vehicle, and the autonomous or smart vehicle automatically directs itself to take an alternate vehicle route and take self-driving actions that allow the autonomous or smart vehicle avoid the emergency vehicle or the route of the emergency vehicle.

7. The computer implemented method of claim 1, wherein the emergency vehicle is an autonomous or smart vehicle, and the autonomous or smart vehicle automatically directs itself to take an alternate vehicle route and take self-driving actions that allow the autonomous or smart vehicle avoid the non-emergency vehicle or the route of the non-emergency vehicle.

8. The computer implemented method of claim 1, the method further comprising adjusting an insurance policy, premium, rate, or discount for the non-emergency vehicle based upon the non-emergency vehicle having the vehicle warning and/or alternate vehicle route generation functionality.

9. A vehicle-mounted system of a non-emergency vehicle for generating emergency vehicle warning data and/or alternate route data, the system comprising one or more processors mounted on the non-emergency vehicle configured to:
    receive, at a time when an associated emergency call is received, emergency vehicle data via wireless communication or data transmission, wherein the emergency vehicle data is representative of an emergency vehicle route that the emergency vehicle will travel, starting from g location of the emergency vehicle at the time when the associated emergency call is received and ending at a location of an associated emergency;
    generate an alternate route based upon computer analysis or comparison of the emergency vehicle data and non-emergency vehicle data, the non-emergency vehicle data associated with a route and current location of the non-emergency vehicle;
    present the alternate route to the driver of the vehicle, or the vehicle itself, such that the driver of the vehicle, or the vehicle itself, may avoid the route of the emergency vehicle or that shortening of the response time for emergency vehicles is facilitated;
    at least one of: collect insurance policy data for the driver of the non-emergency vehicle or generate insurance policy data for the driver of the non-emergency vehicle, via the one or more processors mounted on the non-emergency vehicle, wherein the insurance policy data for the driver of the non-emergency vehicle is based upon the driver following recommendations associated with emergency vehicle warnings or alternate vehicle routing that avoids emergency vehicles en route, and transmit, via the one or more processors mounted on the non-emergency vehicle, the insurance policy data to an insurance provider remote server to facilitate the insurance provider providing auto insurance cost savings to the driver or other insured based upon the insurance policy data and/or functionality associated with emergency vehicle avoidance.

10. The system of claim 9, wherein the non-emergency vehicle is an autonomous vehicle that automatically avoids the route of the emergency vehicle based upon computer comparison or analysis of the emergency and non-emergency vehicle data.

11. The system of claim 9, wherein the emergency vehicle is an autonomous vehicle that automatically avoids the route of the non-emergency vehicle based upon computer comparison or analysis of the emergency and non-emergency vehicle data.

12. The system of claim 9, the one or more processors mounted on the non-emergency vehicle further configured to:

generate vehicle warning data based upon the computer analysis or the comparison of the emergency vehicle data and the non-emergency vehicle data, wherein the vehicle warning data is representative of at least one of: an audible warning to stop, a visual warning to stop, an audible warning to move right, a visual warning to move right, an audible warning to move left, a visual warning to move left, an audible warning to move onto a shoulder of a road, a visual warning to move onto a shoulder of a road, an audible warning to merge to a right lane, a visual warning to merge to a right lane, or an audible warning to duplicate a siren tone.

13. The system of claim 9, the one or more processors mounted on the non-emergency vehicle further configured to:

generate an emergency vehicle warning based upon computer analysis or comparison of the emergency vehicle data and the non-emergency vehicle data; and/or present the emergency vehicle warning to the driver of the vehicle such that the driver of the vehicle, or the vehicle itself, may avoid the route of the emergency vehicle or that shortening of the response time for emergency vehicles is facilitated.

14. A computer implemented method for generating data representative of an emergency vehicle warning and/or alternate vehicle route, the method comprising:

receiving, via or at one or more processors associated with, or mounted on, a non-emergency vehicle, at a time when an associated emergency call is received, emergency vehicle data via wireless communication or data transmission, wherein the emergency vehicle data is representative of an emergency vehicle route that the emergency vehicle will travel, starting from a location of the emergency vehicle at the time when the associated emergency call is received and ending at a location of an associated emergency;

generating, via or at the one or more processors associated with, or mounted on, the non-emergency vehicle, emergency vehicle warning data and alternate vehicle route data based upon computer analysis or comparison of the emergency vehicle data with non-emergency vehicle data, the non-emergency vehicle data including a route and current location of the non-emergency vehicle;

causing, via or at the one or more processors associated with, or mounted on, the non-emergency vehicle, the emergency vehicle warning data and alternate vehicle route data, to be visually or audibly presented, or otherwise provided, to a driver of the non-emergency vehicle to facilitate alleviating potential vehicle accidents between emergency response and non-emergency response vehicles;

generating, via or at the one or more processors associated with, or mounted on, the non-emergency vehicle, insurance policy data for the driver of the non-emergency vehicle based upon the driver following recommendations associated with emergency vehicle warnings or alternate vehicle routing that avoids emergency vehicles en route; and transmitting, via or at the one or more processors associated with, or mounted on, the non-emergency vehicle, to an insurance provider remote server to facilitate the insurance provider providing auto insurance cost savings to the driver or other insured based upon the insurance policy data and/or functionality associated with emergency vehicle avoidance.

15. The computer implemented method of claim 14, the method further comprising adjusting an insurance policy, premium, rate, or discount for the non-emergency vehicle based upon the non-emergency vehicle having the vehicle warning and/or alternate vehicle route generation functionality.

16. The computer implemented method of claim 14, wherein the non-emergency vehicle is an autonomous or smart vehicle, and the autonomous or smart vehicle automatically directs itself to take an alternate vehicle route and take self-driving actions that allow the autonomous or smart vehicle avoid the emergency vehicle or the route of the emergency vehicle.

17. The computer implemented method of claim 14, the method further comprising adjusting an insurance policy, premium, rate, or discount for an autonomous, non-emergency response vehicle based upon the autonomous, non-emergency response vehicle having the vehicle warning and/or alternate vehicle route generation functionality.

18. The computer implemented method of claim 14, the method further comprising adjusting an insurance policy, premium, rate, or discount for the emergency response vehicle based upon the emergency response vehicle having the emergency response vehicle data generation and/or broadcast functionality.

19. The computer implemented method of claim 14, wherein the non-emergency vehicle is an autonomous vehicle that automatically avoids the route of the emergency vehicle based upon computer comparison or analysis of the emergency and non-emergency vehicle data.

20. The computer implemented method of claim 14, further comprising:

transmitting, via the one or more processors mounted on the non-emergency vehicle, emergency vehicle warning data and alternate vehicle route data to other vehicles or processors.

* * * * *